US011955694B2

(12) United States Patent
Huang et al.

(10) Patent No.: US 11,955,694 B2
(45) Date of Patent: Apr. 9, 2024

(54) ANTENNA COMPONENT AND COMMUNICATION DEVICE

(71) Applicant: HuiZhou TCL Mobile Communication Co., Ltd., Guangdong (CN)

(72) Inventors: Yi Huang, Guangdong (CN); Lei Chen, Guangdong (CN); Wei Chen, Guangdong (CN); Yibing Chen, Guangdong (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 328 days.

(21) Appl. No.: 17/442,184

(22) PCT Filed: Nov. 21, 2019

(86) PCT No.: PCT/CN2019/119978
§ 371 (c)(1),
(2) Date: Sep. 23, 2021

(87) PCT Pub. No.: WO2020/228295
PCT Pub. Date: Nov. 19, 2020

(65) Prior Publication Data

US 2022/0181767 A1 Jun. 9, 2022

(30) Foreign Application Priority Data

May 14, 2019 (CN) ........................ 201910399878.X

(51) Int. Cl.
*H01Q 1/52* (2006.01)
*H01Q 1/24* (2006.01)
(Continued)

(52) U.S. Cl.
CPC ............... *H01Q 1/242* (2013.01); *H01Q 1/50* (2013.01); *H01Q 17/001* (2013.01); *H01Q 23/00* (2013.01)

(58) Field of Classification Search
CPC ........ H01Q 1/243; H01Q 1/245; H01Q 21/28; H01Q 1/521; H01Q 21/30; H01Q 17/00;
(Continued)

(56) References Cited

U.S. PATENT DOCUMENTS 6,924,769 B2 8/2005 Ito et al.
7,151,955 B2 12/2006 Huber et al.
(Continued)

FOREIGN PATENT DOCUMENTS

CN 1423365 6/2003
CN 1628398 6/2005
(Continued)

OTHER PUBLICATIONS

International Search Report and the Written Opinion dated Feb. 6, 2020 From the International Searching Authority Re. Application No. PCT/CN2019/119978 and Its Translation of Search Report Into English. (11 Pages).

(Continued)

*Primary Examiner* — Linh V Nguyen

(57) ABSTRACT

An antenna component is provided. An orthographic projection of auxiliary antennas on a clearance area is entirely located in, partly located in, or close to a radiation-sensitive area where a specific absorption ratio (SAR) value of a frequency band needs to be reduced, so that a signal emitted from the radiation-sensitive area where the SAR value of the frequency band needs to be reduced on a primary antenna may be absorbed by the auxiliary antennas, and the auxiliary antennas generate secondary radiation.

17 Claims, 1 Drawing Sheet

(51) Int. Cl.

| | |
|---|---|
| ***H01Q 1/50*** | (2006.01) |
| ***H01Q 17/00*** | (2006.01) |
| ***H01Q 23/00*** | (2006.01) |

(58) Field of Classification Search

CPC .......... H01Q 1/52; H01Q 1/50; H01Q 19/005; H01Q 5/328; H01Q 5/321; H01Q 21/24; H01Q 21/29; H01Q 19/12; H01Q 3/00; H01Q 5/20; H01Q 9/40

USPC .......................................... 343/702, 866, 841

See application file for complete search history.

(56) References Cited

U.S. PATENT DOCUMENTS

| | | | | |
|---|---|---|---|---|
| 7,576,699 | B2 * | 8/2009 | Gilmore | H01Q 1/245 343/810 |
| 8,090,423 | B2 | 1/2012 | Na et al. | |
| 9,407,739 | B2 | 8/2016 | Chen et al. | |
| 9,685,698 | B2 | 6/2017 | Ramachandran | |
| 9,812,773 | B1 * | 11/2017 | Zheng | H01Q 1/2291 |
| 2004/0046701 | A1 * | 3/2004 | Huber | H01Q 1/48 343/702 |
| 2004/0066341 | A1 * | 4/2004 | Ito | H01Q 21/24 343/702 |
| 2004/0090384 | A1 * | 5/2004 | Ostervall | H01Q 1/38 343/702 |
| 2008/0169984 | A1 | 7/2008 | Takagi | |
| 2008/0316114 | A1 * | 12/2008 | Qi | H01Q 19/28 343/702 |
| 2009/0085812 | A1 * | 4/2009 | Qi | H01Q 1/243 29/601 |
| 2009/0143040 | A1 * | 6/2009 | Man | H01Q 1/245 29/601 |
| 2010/0234081 | A1 * | 9/2010 | Wong | H01Q 19/005 455/575.1 |
| 2012/0044115 | A1 * | 2/2012 | McCaughey | H04B 1/3838 343/702 |
| 2013/0249739 | A1 * | 9/2013 | Hsieh | H01Q 3/24 343/700 MS |
| 2014/0057686 | A1 * | 2/2014 | McCaughey | H01Q 1/243 455/575.5 |
| 2014/0225781 | A1 * | 8/2014 | Sato | H01Q 5/371 343/700 MS |
| 2015/0236422 | A1 | 8/2015 | You et al. | |
| 2015/0288074 | A1 * | 10/2015 | Harper | H01Q 9/42 343/833 |
| 2020/0321687 | A1 | 10/2020 | Chen et al. | |

FOREIGN PATENT DOCUMENTS

| | | |
|---|---|---|
| CN | 102013895 | 4/2011 |
| CN | 102548382 | 7/2012 |
| CN | 102769170 | 11/2012 |
| CN | 102800926 | 11/2012 |
| CN | 202616411 | 12/2012 |
| CN | 203039098 | 7/2013 |
| CN | 103579746 | 2/2014 |
| CN | 205211946 | 5/2016 |
| CN | 206907924 | 1/2018 |
| CN | 108258414 | 7/2018 |
| CN | 110323573 | 10/2019 |
| EP | 1359639 | 11/2003 |
| EP | 1394895 | 3/2004 |
| EP | 2192652 | 6/2010 |
| JP | 4066192 | 3/2008 |
| WO | WO 02/05380 | 1/2002 |
| WO | WO 2018/086706 | 5/2018 |

OTHER PUBLICATIONS

Notification of Office Action dated Jul. 3, 2020 From the State Intellectual Property Office of the People's Republic of China Re. Application No. 201910399878.X and Its Translation Into English. (14 Pages).

Supplementary European Search Report and the European Search Opinion dated Jan. 5, 2023 From the European Patent Office Re. Application No. 19928834.1. (9 Pages).

* cited by examiner

ANTENNA COMPONENT AND COMMUNICATION DEVICE

RELATED APPLICATIONS

This application is a National Phase of PCT Patent Application No. PCT/CN2019/119978 having International filing date of Nov. 21, 2019, which claims the benefit of priority of Chinese Patent Application No. 201910399878.X filed on May 14, 2019. The contents of the above applications are all incorporated by reference as if fully set forth herein in their entirety.

FIELD AND BACKGROUND OF THE INVENTION

The present application relates to a communication technology field, and more particularly, to an antenna component and a communication device.

Specific absorption ratio (SAR), otherwise known as SAR value, refers to electromagnetic radiation energy absorbed by a unit of biological tissue per unit time. The less the SAR value, the less radiation emitted from communication devices to organisms. By contrast, the greater the SAR value, the greater the radiation emitted from the communication device to the organisms. Current antenna components often have a problem of excessively high SAR values.

SUMMARY OF THE INVENTION

An objective of the present application is to provide an antenna component and a communication device which are capable of reducing a specific absorption ratio (SAR) value of the antenna component.

In order to achieve the above objective, a technical solution adopted by the present application is: an antenna component, comprising a circuit board, a primary antenna, and auxiliary antennas.

Wherein a surface of the circuit board is provided with a circuit area and a clearance area, both the primary antenna and the auxiliary antennas are disposed corresponding to the clearance area, and the primary antenna is connected to the circuit area of the circuit board;

wherein the auxiliary antennas are neither connected to the primary antenna nor connected to the circuit area of the circuit board, an orthographic projection of the auxiliary antennas on the clearance area is entirely located in, partly located in, or close to a radiation-sensitive area where a specific absorption ratio (SAR) value of a frequency band needs to be reduced, and the auxiliary antennas are configured to receive a signal transmitted from the primary antenna and emit secondary radiation according to the signal; and wherein a length of the auxiliary antennas ranges from ½ to ⅕ of a wavelength of a signal within the frequency band of which the SAR value needs to be reduced.

In some embodiments of the present application, a number of the auxiliary antennas is at least two, and settings of a shape and the number of the auxiliary antennas satisfy that a SAR value of the antenna component that needs to be reduced is less than a target SAR value, and a total radiated power (TRP) loss caused thereby is less than a threshold value.

In some embodiments of the present application, the auxiliary antennas, of which the number is at least two, are formed at intervals on a surface of the clearance area of the circuit board, and the primary antenna is located at a side of the surface of the clearance area of the circuit board and is spaced apart from the circuit board.

Another technical solution adopted by the present application is: an antenna component, comprising a circuit board, a primary antenna, and auxiliary antennas.

Wherein a surface of the circuit board is provided with a circuit area and a clearance area, both the primary antenna and the auxiliary antennas are disposed corresponding to the clearance area, and the primary antenna is connected to the circuit area of the circuit board; and wherein the auxiliary antennas are neither connected to the primary antenna nor connected to the circuit area of the circuit board, an orthographic projection of the auxiliary antennas on the clearance area is entirely located in, partly located in, or close to a radiation-sensitive area where a specific absorption ratio (SAR) value of a frequency band needs to be reduced, and the auxiliary antennas are configured to receive a signal transmitted from the primary antenna and emit secondary radiation according to the signal.

In some embodiments of the present application, a number of the auxiliary antennas is at least two, and settings of a shape and the number of the auxiliary antennas satisfy that a SAR value of the antenna component that needs to be reduced is less than a target SAR value, and a total radiated power (TRP) loss caused thereby is less than a threshold value.

In some embodiments of the present application, the auxiliary antennas, of which the number is at least two, are formed at intervals on a surface of the clearance area of the circuit board, and the primary antenna is located at a side of the surface of the clearance area of the circuit board and is spaced apart from the circuit board.

In some embodiments of the present application, the auxiliary antennas are formed by etching, sputtering, or coating on the surface of the clearance area of the circuit board.

In some embodiments of the present application, the auxiliary antennas are in an electrical floating state.

In some embodiments of the present application, each of the auxiliary antennas is parallel to a side of the circuit board close to the auxiliary antennas.

In some embodiments of the present application, a distance between the primary antenna and at least one of the auxiliary antennas is less than ¼ of a wavelength of a signal within the frequency band of which the SAR value needs to be reduced.

In some embodiments of the present application, a signal frequency of the secondary radiation emitted by the auxiliary antennas is consistent with a signal frequency of radiation emitted from the radiation-sensitive area.

In order to achieve the above objective, another technical solution adopted by the present application is: a communication device, comprising an antenna component, and the antenna component comprises:

a circuit board, a primary antenna, and auxiliary antennas;

wherein a surface of the circuit board is provided with a circuit area and a clearance area, both the primary antenna and the auxiliary antennas are disposed corresponding to the clearance area, and the primary antenna is connected to the circuit area of the circuit board; and wherein the auxiliary antennas are neither connected to the primary antenna nor connected to the circuit area of the circuit board, an orthographic projection of the auxiliary antennas on the clearance area is entirely located in, partly located in, or close to a radiation-sensitive area where a specific absorption ratio (SAR) value of a frequency band needs to be reduced, and the auxiliary antennas are configured to receive a signal transmitted from the primary antenna and emit secondary radiation according to the signal.

In some embodiments of the present application, a number of the auxiliary antennas is at least two, and settings of a shape and the number of the auxiliary antennas satisfy that a SAR value of the antenna component that needs to be reduced is less than a target SAR value, and a total radiated power (TRP) loss caused thereby is less than a threshold value.

In some embodiments of the present application, the auxiliary antennas, of which the number is at least two, are formed at intervals on a surface of the clearance area of the circuit board, and the primary antenna is located at a side of the surface of the clearance area of the circuit board and is spaced apart from the circuit board.

In some embodiments of the present application, the auxiliary antennas are formed by etching, sputtering, or coating on the surface of the clearance area of the circuit board.

In some embodiments of the present application, the auxiliary antennas are in an electrical floating state.

In some embodiments of the present application, each of the auxiliary antennas is parallel to a side of the circuit board close to the auxiliary antennas.

In some embodiments of the present application, a length of the auxiliary antennas ranges from ½ to ⅕ of a wavelength of a signal within the frequency band of which the SAR value needs to be reduced.

In some embodiments of the present application, a distance between the primary antenna and at least one of the auxiliary antennas is less than ¼ of a wavelength of a signal within the frequency band of which the SAR value needs to be reduced.

In some embodiments of the present application, a signal frequency of the secondary radiation emitted by the auxiliary antennas is consistent with a signal frequency of radiation emitted from the radiation-sensitive area.

BENEFICIAL EFFECT

Compared with the prior art, a beneficial effect of the present application is that an orthographic projection of auxiliary antennas on a clearance area is entirely located in, partly located in, or close to a radiation-sensitive area where a specific absorption ratio (SAR) value of a frequency band needs to be reduced, so that a signal emitted from the radiation-sensitive area where the SAR value of the frequency band needs to be reduced on a primary antenna may be absorbed by the auxiliary antennas, and the auxiliary antennas generate secondary radiation. That is, the auxiliary antennas will then radiate the received signal, thereby dispersing hot spots of the primary antenna, that is, concentration of radiation will be reduced, thereby reducing the SAR value.

DESCRIPTION OF SPECIFIC EMBODIMENTS OF THE INVENTION

The present application is described in detail below with reference to appending drawings.

Figure 1:
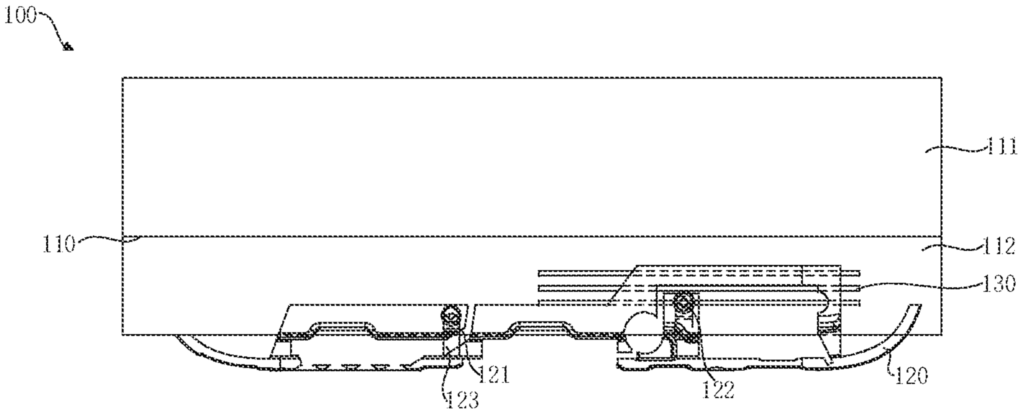
FIG. 1 is a schematic structural diagram showing an antenna component according to an embodiment of the present application.
Figure 2:
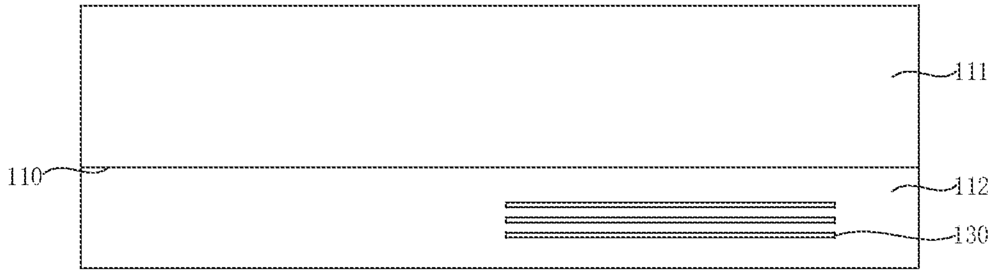
FIG. 2 is a schematic positional diagram showing a position of auxiliary antennas disposed on a circuit board in the antenna component according to an embodiment of the present application.

Refer to FIG. 1 and FIG. 2. FIG. 1 is a schematic structural diagram showing an antenna component 100 according to an embodiment of the present application. FIG. 2 is a schematic positional diagram showing a position of auxiliary antennas 130 disposed on a circuit board 110 in the antenna component 100 according to an embodiment of the present application. As shown in FIG. 1 and FIG. 2, the antenna component 100 includes the circuit board 110, a primary antenna 120, and the auxiliary antennas 130.

A surface of the circuit board 110 is provided with a circuit area 111 and a clearance area 112. The circuit board 110 may be a printed circuit board (PCB) with a size of 100 mm*50 mm*1 mm. The circuit area 111 is an area on which the circuit board 110 is provided with metal wiring. The circuit area 111 is provided with a signal feeding terminal (not shown) and a ground terminal (not shown). The signal feeding terminal may be a current signal output terminal on the circuit area 111. The ground terminal and the signal feeding terminal are disposed at an interval, and the ground terminal is grounded for the primary antenna 120. The clearance area 112 of the present application refers to an area where a surface of the circuit board 110 around the primary antenna 120 is not provided with metal wiring under the premise that performance of the primary antenna 120 meets preset requirements. The clearance area 112 may be shaped as a conventional rectangle, or may be an irregular area with bent edges. Wherein, the clearance area 112 is disposed according to the primary antenna 120 capable of achieving better performance in general.

Both the primary antenna 120 and the auxiliary antennas 130 are disposed corresponding to the clearance area 112, and the primary antenna 120 is connected to the circuit area 111 of the circuit board 110. A structure of the primary antenna 120 can be changed according to a specific transceiver frequency. The primary antenna 120 may be provided with a feeding point 121 and a ground point 122. The feeding point 121 can be connected to the signal feeding terminal disposed on the circuit area 111 through an elastic piece 123 or a thimble (not shown). The ground point 122 is connected to the ground terminal disposed on the circuit area 111 through the elastic piece 123 or the thimble.

The auxiliary antennas 130 are neither connected to the primary antenna 120 nor connected to the circuit area 111 of the circuit board 110, an orthographic projection of the auxiliary antennas 130 on the clearance area 112 is entirely located in, partly located in, or close to a radiation-sensitive area where a specific absorption ratio (SAR) value of a frequency band needs to be reduced, and the auxiliary antennas 130 are configured to receive a signal transmitted from the primary antenna 120 and emit secondary radiation according to the signal. The frequency band of which the SAR value needs to be reduced on the primary antenna 120 may be a frequency band of which a SAR value exceeds a target SAR value on the primary antenna 120. The target SAR value can be specified by a national standard or an international standard. For example, a SAR value of European standard (EU) is 2 w/kg, a SAR value of American standard (US) is 1.6 w/kg. It can be understood that the target SAR value may also be a standard specified by a manufacturer of the antenna component 100, such as 1.2 w/kg, 1.3 w/kg, 1.4 w/kg, or 1.5 w/kg. By ways such as simulation and testing, the frequency band of which the SAR value needs to be reduced in the antenna component 100 can be determined, and then the radiation-sensitive area, which the SAR value of the frequency band needs to be reduced, on the primary antenna 120 can be determined through simulation software (it can be computer simulation technology (CST) or electromagnetic field simulation software). The radiation-sensitive area may refer to an area where radiation of a signal within the frequency band of which the SAR value needs to be reduced is concentrated on the primary antenna 120. The closer a distance between the auxiliary antennas 130 disposed on the circuit board 110 and the radiation-sensitive area, the better effects may be. The auxiliary antennas 130 may be disposed on the circuit board 110 directly below the radiation-sensitive area.

In the present embodiment, the orthographic projection of the auxiliary antennas 130 on the clearance area 112 is entirely located in, partly located in, or close to the radiation-sensitive area where the SAR value of the frequency band needs to be reduced, so that a signal emitted from the radiation-sensitive area where the SAR value of the frequency band needs to be reduced on the primary antenna 120 may be absorbed by the auxiliary antennas, and the auxiliary antennas 130 generate secondary radiation. That is, the auxiliary antennas 130 will then radiate the received signal, thereby dispersing hot spots of the primary antenna 120, that is, concentration of radiation will be reduced, thereby reducing the SAR value. Furthermore, because the auxiliary antennas 130 will then radiate the received signal, although this may not have effect or have a very weak effect on signal strength and radiation efficiency of a mobile phone, and radiation efficiency of the antenna component 100 is reduced to a certain degree, since the SAR value of the antenna component 100 is reduced, energy of radiation which is emitted by the antenna component 100 and is absorbed by the human body is also reduced, and power loss of the antenna component 100 is also reduced, so that total radiated power of the antenna component 100 is not greatly affected. Therefore, according to the antenna component 100 of the present application, the total radiated power of the antenna component 100 is ensured and the SAR value of the antenna component 100 is reduced.

Further, settings of a shape and a number of the auxiliary antennas 130 may satisfy that a SAR value of the antenna component 100 that needs to be reduced is less than a target SAR value. In addition, the settings of the shape and the number of the auxiliary antennas 130 may satisfy that a total radiated power (TRP) loss of the antenna component 100 caused by the addition of auxiliary antennas 130 is less than a threshold value. The target SAR value can be specified by a national standard or an international standard. For example, the SAR value of European standard (EU) is 2 w/kg, the SAR value of American standard (US) is 1.6 w/kg. It can be understood that the target SAR value may also be a standard specified by a manufacturer of the antenna component 100, such as 1.2 w/kg, 1.3 w/kg, 1.4 w/kg, or 1.5 w/kg. The auxiliary antennas 130 may be shaped as a regular shape such as a rectangle or an ellipse, or the auxiliary antennas 130 may be shaped as an irregular shape such a rectangle having special-shaped cuts, grooves, and protrusions.

Further, the number of the auxiliary antennas 130 may need to satisfy that the SAR value of the antenna component 100 that needs to be reduced is less than the target SAR value. That is, if n−1 auxiliary antennas 130 are disposed, the SAR value of the antenna component 100 is greater than or equal to the target SAR value, and if n auxiliary antennas 130 are disposed, the SAR value of the antenna component 100 is less than the target SAR value, then the number of the auxiliary antennas 130 disposed on the clearance area 112 may be greater than or equal to n. For example, n=1, one auxiliary antenna, or two, three, four, five, or six auxiliary antennas 130 can be disposed. Preferably, the number of the disposed auxiliary antennas 130 is exactly n. That is, disposing n auxiliary antennas 130 may just make the SAR value of the antenna component 100 be less than the target SAR value. For example, in an actual project, an initial SAR value of the antenna component 100 is 2.5 w/kg, and a target SAR value is 1.6 w/kg. When two auxiliary antennas 130 are installed, the SAR value of the antenna component 100 becomes 1.53 w/kg, a little TRP loss is caused, and a third auxiliary antenna 130 is unnecessary to be installed. If the third auxiliary antenna 130 is further installed, the SAR value will be less, but greater TRP loss may be caused. Terms that the number of the auxiliary antennas 130 needs to satisfy may further be that the TRP loss of the antenna component 100 caused by the addition of auxiliary antennas 130 is less than a threshold value. That is, if n−1 auxiliary antennas 130 are disposed, the SAR value of the antenna component 100 is greater than or equal to the target SAR value, if n auxiliary antennas 130 are disposed, the SAR value of the frequency band that needs to be reduced is less than the target SAR value, the TRP loss caused by disposing m auxiliary antennas 130 is less than the threshold, and the TRP loss caused by disposing m+1 auxiliary antennas 130 is greater than or equal to the threshold, then the number of auxiliary antennas 130 disposed on the clearance area 112 can be any one of n to m. For example, n=1 and m=4, and one auxiliary antenna 130, or two or three auxiliary antennas 130 may be disposed.

Further, in addition, the number of the auxiliary antennas 130 may be at least two. The auxiliary antennas 130, of which the number is at least two, are formed at intervals on a surface of the clearance area 112 of the circuit board 110. The auxiliary antennas 130 can be disposed on the surface of the clearance area 112 of the circuit board 110 at intervals, so that the auxiliary antennas 130 can receive signals emitted by the primary antenna 120, respectively, and the auxiliary antennas 130 will not interfere with each other when receiving signals and transmitting information, thereby, the SAR value of the antenna component 100 can be well reduced, and an impact on the TRP of the antenna component 100 can be reduced.

Furthermore, the primary antenna 120 is located at a side of the surface of the clearance area 112 of the circuit board 110. The primary antenna 120 may be entirely or partly located above the clearance area 112. A distance between the primary antenna 120 and the circuit board 110 may be less than 8 mm. The primary antenna 120 and the auxiliary antennas 130 may be separated by a certain height along a direction perpendicular to the circuit board 110.

Further, the primary antenna 120 may be spaced apart from the circuit board 110. That is, along a direction from the clearance area 112 to the circuit board 110, the primary antenna 120 may be spaced apart from the circuit board 110. Moreover, the primary antenna 120 and the auxiliary antennas 130 may be disposed at a same side of the clearance area 112.

Further, the auxiliary antennas 130 are formed by etching, sputtering, or coating on the surface of the clearance area 112 of the circuit board 110. The auxiliary antennas 130 may be etched while or before forming the clearance area 112 on the circuit board 110, and a material of the auxiliary antennas 130 may be the same as a material of circuit wiring disposed on the circuit board 110. The auxiliary antennas 130 may also be formed by coating or sputtering after forming the clearance area 112 on the circuit board 110. The material of the auxiliary antennas 130 may be metal. In order to increase efficiency of receiving signals and transmitting signals of the auxiliary antennas 130, a material having a higher dielectric constant may be adopted to form the auxiliary antennas 130.

Further, the auxiliary antennas 130 are in an electrical floating state. The primary antenna 120 radiates a first electromagnetic wave into space under action of a first alternating current, and the auxiliary antennas 130 can self-induce a second alternating current under the action of the first electromagnetic wave in the space, so that the auxiliary antennas 130 radiate the second electromagnetic wave into the space under action of the second alternating current induced by themself. A frequency of the first alternating current may be consistent with a frequency of the second alternating current, and a frequency of the first electromagnetic wave may be consistent with a frequency of the second electromagnetic wave. The auxiliary antennas 130 themself can realize functions of receiving and transmitting signals.

Further, each of the auxiliary antennas 130 is parallel to a side of the circuit area 111 close to the auxiliary antennas 130.

Further, a distance between one of the auxiliary antennas 130 and the primary antenna 120 is less than ¼ of a wavelength of a signal within the frequency band of which the SAR value needs to be reduced. That is, along the direction perpendicular to the circuit board 110, the distance between the auxiliary antenna 130 and the primary antenna 120 is less than ¼ of the wavelength of the signal within the frequency band of which the SAR value needs to be reduced. Because if the distance between the auxiliary antennas 130 and the primary antenna 120 is greater than or equal to ¼ of the wavelength of the signal within the frequency band of which the SAR value needs to be reduced, the auxiliary antennas 130 may only receive a weaker signal emitted by the primary antenna 120, hot spots radiated by the antenna component 100 may not be well dispersed, and there may only be a small impact on the SAR value of the antenna component 100. Therefore, in order to make the auxiliary antennas 130 be capable of better receiving the signal emitted by the primary antenna 120 and emitting secondary signal, the shorter distance between the auxiliary antennas 130 and the primary antenna 120 is needed, so that the SAR value can be well reduced.

Further, a length of the auxiliary antennas 130 ranges from ½ to ⅕ of a wavelength of a signal within the frequency band of which the SAR value needs to be reduced. The length of the auxiliary antennas 130 may be ⅓ or ¼ of the wavelength of the signal within the frequency band of which the SAR value needs to be reduced. Preferably, the length of the auxiliary antennas 130 may be ¼ of the wavelength of the signal within the frequency band of which the SAR value needs to be reduced, and the auxiliary antennas 130 have good receiving and radiation capabilities in terms of this length. It can be understood that the length of the auxiliary antennas 130 may be adjusted according to the distance between the auxiliary antennas 130 and the primary antenna 120. The greater the distance between the auxiliary antennas 130 and the primary antenna 120, a longer length of the auxiliary antennas 130 can be set. For example, the length of the auxiliary antennas 130 can be ½ or ⅓ of the wavelength of the signal within the frequency band of which the SAR value needs to be reduced. The slightly less the distance between the auxiliary antennas 130 and the primary antenna 120, a shorter length of the auxiliary antennas 130 can be set. For example, the length of the auxiliary antennas 130 can be ¼ of the wavelength of the signal within the frequency band of which the SAR value needs to be reduced.

Figure 3:
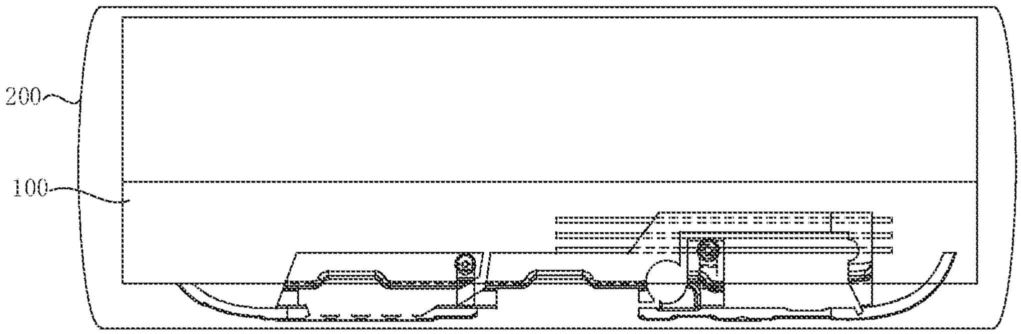
FIG. 3 is a schematic structural diagram showing a communication device according to an embodiment of the present application.

Refer to FIG. 3, which is a schematic structural diagram showing a communication device 200 according to an embodiment of the present application. The communication device 200 includes the antenna component 100 in any one of the above-mentioned implementations, and its specific structure is not repeated here.

In the present embodiment, the orthographic projection of the auxiliary antennas 130 on the clearance area 112 is entirely located in, partly located in, or close to the radiation-sensitive area where the SAR value of the frequency band needs to be reduced, so that the signal emitted from the radiation-sensitive area where the SAR value of the frequency band needs to be reduced on the primary antenna 120 may be absorbed by the auxiliary antennas, and the auxiliary antennas 130 generate secondary radiation. That is, the auxiliary antennas 130 will then radiate the received signal, thereby dispersing the hot spots of the primary antenna 120, that is, concentration of radiation will be reduced, thereby reducing the SAR value.

The above are only implementations of the present application, and it is not intended to limit the patent scope of the present application. Any equivalent structure or equivalent process transformation made or applying directly or indirectly to other related technical fields by using contents of the specification and the appending drawings of the present application shall be included in the patent protection scope of the present application for the same reasons.

What is claimed is:

1. An antenna component, comprising:

a circuit board, a primary antenna, and auxiliary antennas;

wherein a surface of the circuit board is provided with a circuit area and a clearance area, both the primary antenna and the auxiliary antennas are disposed corresponding to the clearance area, and the primary antenna is connected to the circuit area of the circuit board;

wherein the auxiliary antennas are neither connected to the primary antenna nor connected to the circuit area of the circuit board, an orthographic projection of the auxiliary antennas on the clearance area is entirely located in, partly located in, or close to a radiation-sensitive area where a specific absorption ratio (SAR) value of a frequency band needs to be reduced, and the auxiliary antennas are configured to receive a signal transmitted from the primary antenna and emit secondary radiation according to the signal;

wherein a length of the auxiliary antennas ranges from ½ to ⅕ of a wavelength of a signal within the frequency band of which the SAR value needs to be reduced;

wherein a number of the auxiliary antennas is at least two, and settings of a shape and the number of the auxiliary antennas satisfy that a SAR value of the antenna component that needs to be reduced is less than a target SAR value, and a total radiated power (TRP) loss caused thereby is less than a threshold value, and wherein a distance between the primary antenna and one of the auxiliary antennas is less than ¼ of the wavelength of the signal within the frequency band of which the SAR value needs to be reduced, and the auxiliary antennas are all located between the primary antenna and the circuit area.

2. The antenna component as claimed in claim 1, wherein the auxiliary antennas, of which the number is at least two, are disposed at intervals on a surface of the clearance area of the circuit board, and the primary antenna is located at a side of the surface of the clearance area of the circuit board and is spaced apart from the circuit board.

3. An antenna component, comprising:

a circuit board, a primary antenna, and auxiliary antennas;

wherein a surface of the circuit board is provided with a circuit area and a clearance area, both the primary antenna and the auxiliary antennas are disposed corresponding to the clearance area, and the primary antenna is connected to the circuit area of the circuit board;

wherein the auxiliary antennas are neither connected to the primary antenna nor connected to the circuit area of the circuit board, an orthographic projection of the auxiliary antennas on the clearance area is entirely located in, partly located in, or close to a radiation-sensitive area where a specific absorption ratio (SAR) value of a frequency band needs to be reduced, and the auxiliary antennas are configured to receive a signal transmitted from the primary antenna and emit secondary radiation according to the signal;

wherein a number of the auxiliary antennas is at least two, and wherein a distance between the primary antenna and one of the auxiliary antennas is less than ¼ of a wavelength of a signal within the frequency band of which the SAR value needs to be reduced, a length of the auxiliary antennas ranges from ½ to ⅕ of the wavelength of the signal within the frequency band of which the SAR value needs to be reduced, and the auxiliary antennas are all located between the primary antenna and the circuit area.

4. The antenna component as claimed in claim 3, wherein the auxiliary antennas, of which the number is at least two, are disposed at intervals on a surface of the clearance area of the circuit board, and the primary antenna is located at a side of the surface of the clearance area of the circuit board and is spaced apart from the circuit board.

5. The antenna component as claimed in claim 3, wherein the auxiliary antennas are in an electrical floating state.

6. The antenna component as claimed in claim 3, wherein each of the auxiliary antennas is parallel to a side of the circuit board close to the auxiliary antennas.

7. The antenna component as claimed in claim 3, wherein a signal frequency of the secondary radiation emitted by the auxiliary antennas is consistent with a signal frequency of radiation emitted from the radiation-sensitive area.

8. A communication device, wherein the communication device comprises an antenna component, and the antenna component comprises:

a circuit board, a primary antenna, and auxiliary antennas;

wherein a surface of the circuit board is provided with a circuit area and a clearance area, both the primary antenna and the auxiliary antennas are disposed corresponding to the clearance area, and the primary antenna is connected to the circuit area of the circuit board;

wherein the auxiliary antennas are neither connected to the primary antenna nor connected to the circuit area of the circuit board, an orthographic projection of the auxiliary antennas on the clearance area is entirely located in, partly located in, or close to a radiation-sensitive area where a specific absorption ratio (SAR) value of a frequency band needs to be reduced, and the auxiliary antennas are configured to receive a signal transmitted from the primary antenna and emit secondary radiation according to the signal;

wherein a number of the auxiliary antennas is at least two, and settings of a shape and the number of the auxiliary antennas satisfy that the SAR value of the antenna component that needs to be reduced is less than a target SAR value, and a total radiated power (TRP) loss caused thereby is less than a threshold value, and wherein a distance between the primary antenna and one of the auxiliary antennas is less than ¼ of a wavelength of a signal within the frequency band of which the SAR value needs to be reduced, a length of the auxiliary antennas ranges from ½ to ⅕ of the wavelength of the signal within the frequency band of which the SAR value needs to be reduced, and the auxiliary antennas are all located between the primary antenna and the circuit area.

9. The communication device as claimed in claim 8, wherein the auxiliary antennas, of which the number is at least two, are disposed at intervals on a surface of the clearance area of the circuit board, and the primary antenna is located at a side of the surface of the clearance area of the circuit board and is spaced apart from the circuit board.

10. The communication device as claimed in claim 8, wherein the auxiliary antennas are in an electrical floating state.

11. The communication device as claimed in claim 8, wherein each of the auxiliary antennas is parallel to a side of the circuit board close to the auxiliary antennas.

12. The communication device as claimed in claim 8, wherein a signal frequency of the secondary radiation emitted by the auxiliary antennas is consistent with a signal frequency of radiation emitted from the radiation-sensitive area.

13. The antenna component as claimed in claim 1, wherein a distance between the primary antenna and the circuit board is less than 8 mm.

14. The antenna component as claimed in claim 3, wherein a distance between the primary antenna and the circuit board is less than 8 mm.

15. The communication device as claimed in claim 8, wherein a distance between the primary antenna and the circuit board is less than 8 mm.

16. The antenna component as claimed in claim 3, wherein settings of a shape and the number of the auxiliary antennas satisfy that the SAR value of the antenna component that needs to be reduced is less than a target SAR value, and a total radiated power (TRP) loss caused thereby is less than a threshold value.

17. The communication device as claimed in claim 8, wherein settings of a shape and the number of the auxiliary antennas satisfy that the SAR value of the antenna component that needs to be reduced is less than a target SAR value, and a total radiated power (TRP) loss caused thereby is less than a threshold value.

* * * * *